(12) United States Patent
Vo et al.

(10) Patent No.: US 6,483,254 B2
(45) Date of Patent: Nov. 19, 2002

(54) LED STROBE LIGHT

(75) Inventors: Nam H. Vo, Marysville, OH (US); Nicolo F. Machi, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/907,272

(22) Filed: Jul. 17, 2001

(65) Prior Publication Data

US 2002/0101189 A1 Aug. 1, 2002

Related U.S. Application Data

(60) Provisional application No. 60/257,204, filed on Dec. 20, 2000.

(51) Int. Cl.[7] .............................................. H05B 37/00
(52) U.S. Cl. ................... 315/241 S; 315/291; 315/294; 315/312; 362/800; 362/227; 340/468; 340/815.45
(58) Field of Search ........................... 315/241 S, 312, 315/291, 294, 297; 362/800, 362, 227, 434; 340/468, 469, 472, 948, 961, 815.45; 244/158 R, 117 R; 250/493.1, 214 RC

(56) References Cited

U.S. PATENT DOCUMENTS

| | | | | |
|---|---|---|---|---|
| 4,277,170 A | * | 7/1981 | Miles | 340/961 |
| 4,527,158 A | * | 7/1985 | Runnels | 340/961 |
| 4,827,245 A | | 5/1989 | Lipman | 340/321 |
| 4,912,334 A | * | 3/1990 | Anderson | 250/493.1 |
| 5,057,820 A | * | 10/1991 | Markson et al. | 250/214 RC |
| 5,450,301 A | | 9/1995 | Waltz et al. | 362/231 |
| 5,452,188 A | | 9/1995 | Green et al. | 362/227 |
| 5,736,925 A | | 4/1998 | Knauff et al. | 340/468 |
| 5,806,965 A | | 9/1998 | Deese | 362/249 |
| 5,890,794 A | | 4/1999 | Abtahi | 362/294 |
| 5,984,228 A | * | 11/1999 | Pham | 244/100 R |
| 5,990,802 A | | 11/1999 | Maskeny | 340/815.45 |
| 6,088,050 A | | 7/2000 | Ng | 347/237 |
| 6,137,518 A | | 10/2000 | Maeda | 347/131 |
| 6,161,910 A | * | 12/2000 | Reisenauer et al. | 315/158 |
| 6,203,180 B1 | * | 3/2001 | Fleischmann | 362/147 |

FOREIGN PATENT DOCUMENTS

| | | |
|---|---|---|
| WO | 95/19525 | 7/1995 |
| WO | 97/29320 | 8/1997 |

OTHER PUBLICATIONS

Internet web page www.avimo.com/air_systems/pages/nvglighting,htm, visited Jul. 3, 2001.

* cited by examiner

Primary Examiner—Haissa Philogene
(74) Attorney, Agent, or Firm—Larry J. Palguta

(57) ABSTRACT

An LED strobe light is disclosed. The strobe light (600) uses light emitting diodes (402) arranged about the circumference of an electrically insulative, thermally conductive disk (404) to form an LED light ring (400). LED Light rings (400) may be stacked as desired, with electrically conductive rings (502) placed between light rings (400). A control circuit (614) conditions voltage and current to a level with the LEDs and regulates the on-off timing of the LEDs.

18 Claims, 11 Drawing Sheets

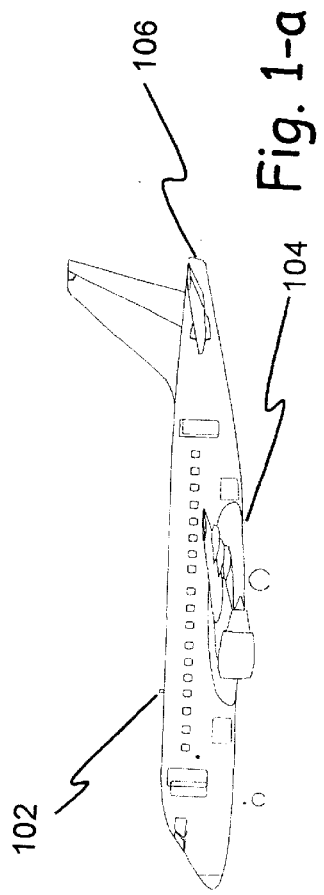
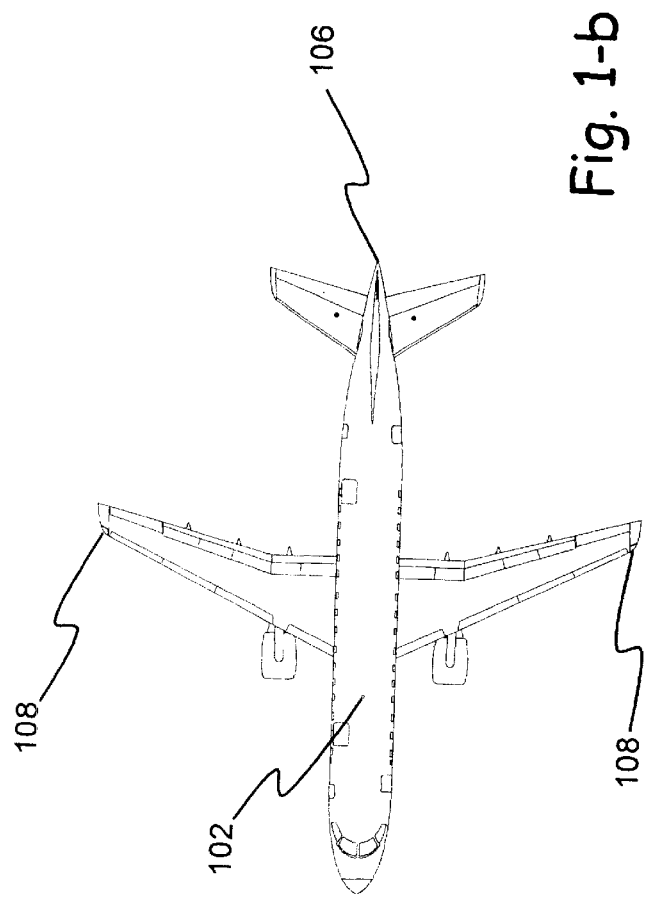

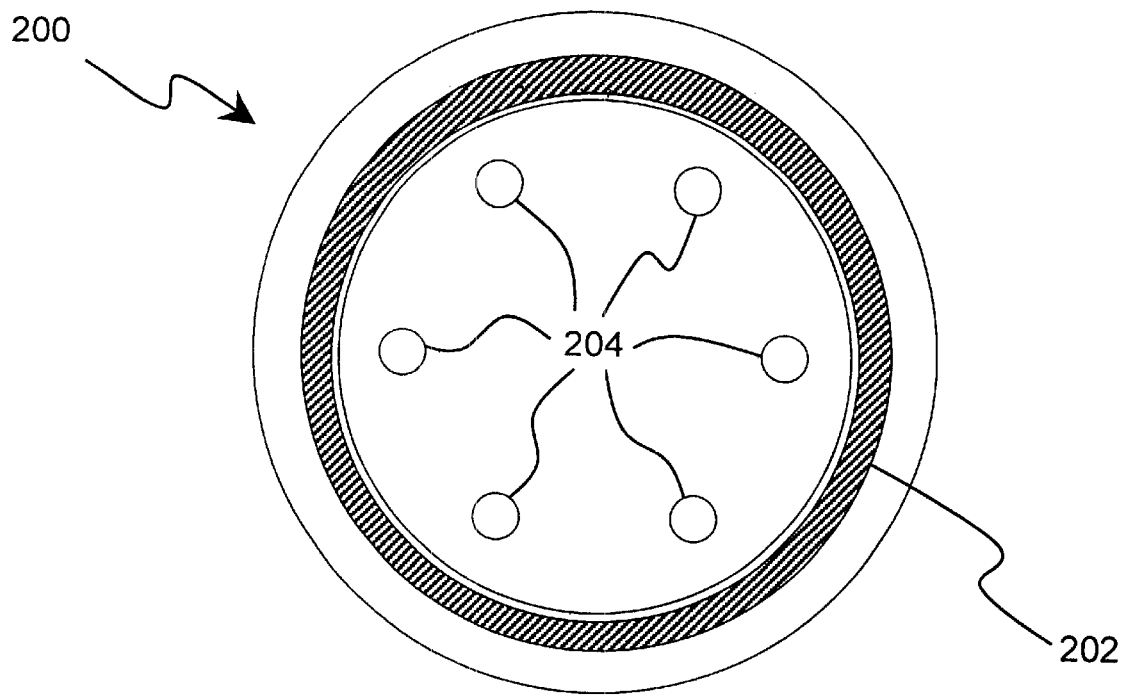
Fig. 2-a
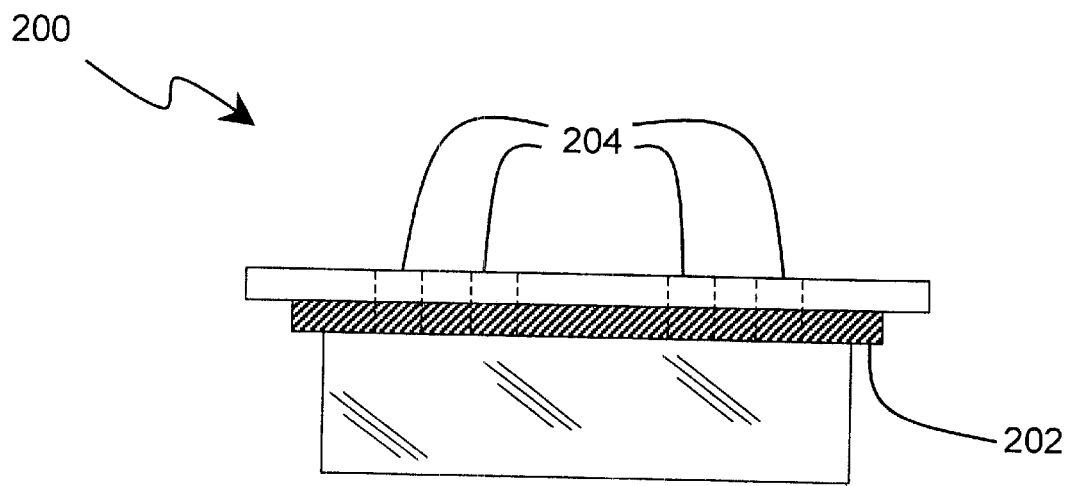
Fig. 2-b

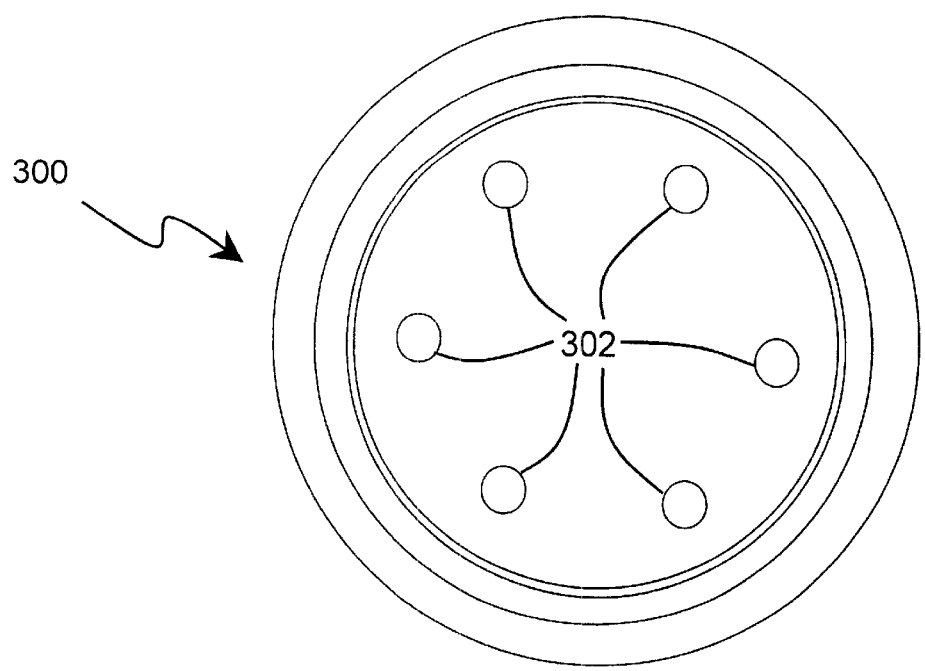
Fig. 3-a
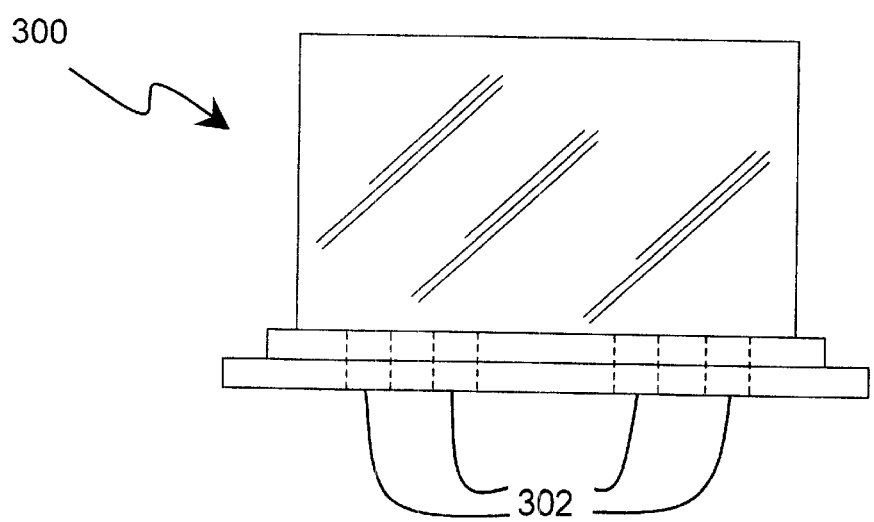
Fig. 3-b

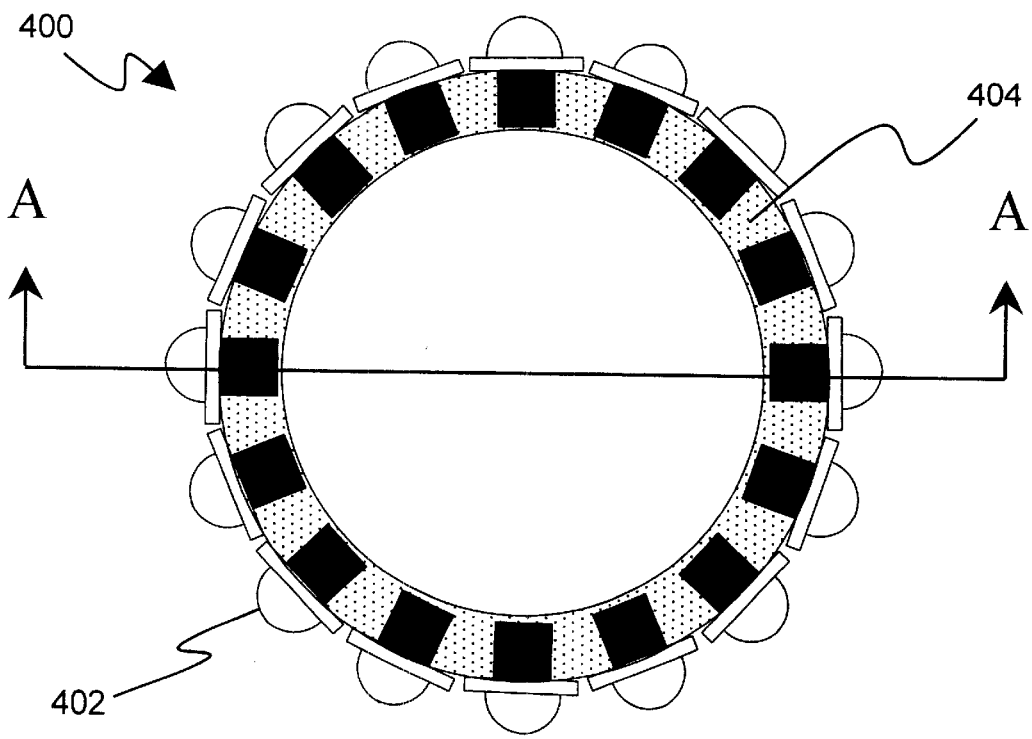
Fig. 4-a
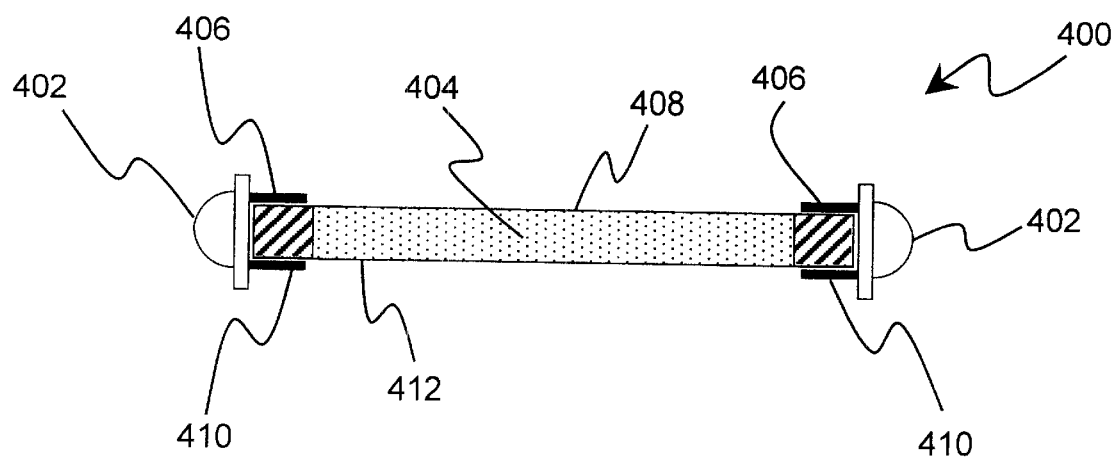
Section A-A
Fig. 4-b

LED STROBE LIGHT

This application claims the benefit of Provisinal Application No. 60/257,204 filed Dec. 20, 2000.

BACKGROUND OF THE INVENTION

1. Field of the Invention

This invention relates to a strobe light. Specifically, the invention is directed to a strobe light that uses light emitting diodes.

2. Description of the Related Art

Aircraft operating at night utilize a variety of lights to attract the attention of other aircraft operating in the same airspace, in order to prevent collisions between aircraft. One such lighting system is the anticollision lighting system. A typical anticollision lighting system consists of flashing lights installed at several points on the aircraft to ensure that the lighted aircraft is visible to other aircraft operating in the vicinity. Anticollision lights are typically mounted on the aircraft's upper and lower fuselage, the tail, and the wingtips.

Anticollision lights have previously been installed on aircraft for this purpose, but they suffer from several disadvantages. Prior anticollision lights commonly use incandescent lamps and flashers or "rotating beacon" mechanisms to create an attention-getting pattern of light. However, flashers and rotating beacons suffer from limited life due to lamp burn-out and mechanism wear. The amount of light emitted from these anticollision lights is also relatively low, affording limited attention-getting light at distances from the aircraft.

Many flashers and rotating beacon lights have been replaced by "strobe" lights owing to the strobe's brilliant, sharp flash and high light output. Strobe lights also offer increased service life over flashers and rotating beacons due to the lack of incandescent lamps and moving parts. In a typical strobe lighting system, aircraft electrical power is converted to a high-voltage direct current (DC) potential. The high-voltage DC is applied to a xenon gas lamp, which is "triggered" to arc between its anode and cathode terminals by a second voltage which is applied to the lamp's grid terminal. Although more reliable than flashers and rotating beacons, prior strobe lights still suffer from a relatively short service life due to degradation of the strobe's electronic components as a result of the continuous high-voltage charge and discharge cycles associated with each flash of the lamp.

Light emitting diodes ("LEDs") have previously been utilized for aircraft lighting, such as Fleischmann U.S. Pat. No. 6,203,180. However, Fleischmann teaches the use of light emitting diodes for interior cabin illumination, rather than exterior anticollision lighting, and does not address the attention-getting characteristics necessary for strobe lights. Anderson U.S. Pat. No. 4,912,334 discloses the use of light emitting diodes for anticollision lighting during covert aircraft operations. However, the requirements of anticollision lighting for covert and non-covert operations differ considerably. Covert operations require the use of infra-red emitting diodes visible only to night vision imaging equipment. Further, the desired light output of covert anticollision lighting is of a comparatively low level and is intended to provide awareness only to other "friendly" aircraft operating in the immediate vicinity of the lighted aircraft. In contrast, the goal of non-covert visible-light anticollision lighting is to provide sufficient notice to other aircraft at significant distances from the lighted aircraft in time to avoid collisions or emergency evasion procedures. There is a need for a strobe light which provides a sharp, bright pulse of visible light that can be seen at the significant distances desired for non-covert strobe anticollision lighting and which provides long operating life in the harsh aircraft environment.

SUMMARY OF THE INVENTION

This invention is directed to a strobe light that provides the sharp, bright pulse of light desired for non-covert anticollision lighting without resorting to a xenon lamp and a complex high-voltage power converter.

Specifically, the present invention includes a multitude of solid-state light sources, preferably light emitting diodes. The LEDs are arranged about the circumference of a disk to form a "light ring" having 360-degree coverage for light emission. Light rings may be stacked if desired in order to produce the desired photometric output characteristics. When the LEDs are arranged in an array configuration, the LEDs can provide beneficial attributes such as inherent redundancy. If one or more of the LEDs in the array were to fail, the remaining LEDs will continue to operate.

The LED strobe light may include a housing structure to contain internal components of the LED strobe light. The housing may include mounting points or a mounting flange to facilitate installation of the LED strobe light onto the aircraft. The housing and mounting arrangement may be shaped to permit replacement of a prior flashing light, rotating beacon, or xenon strobe with the LED strobe, without the need to modify the structure of the aircraft. The LED strobe may also incorporate a lens to protect the components from the elements.

Electrical power from the aircraft is connected to a control circuit which conditions the voltage and current to a level compatible with the LEDs. The control circuit may be mounted inside the housing structure, or may be located remotely. The control circuit provides sufficient electrical power to activate the LEDs while preventing over-driving of the LEDs. The control circuit also regulates the on-off timing of the LEDs, applying an electrical pulse to the LEDs approximately once per second, to produce a regular burst of light.

The control circuit may optionally provide temperature compensation for stabilized strobe light brightness with variations in ambient temperature. The control circuit may also optionally include self-diagnostic capabilities. For example, the control circuit may monitor the strobe light for fault conditions and alert the flight crew by means of an electrical output signal connected to a warning indicator in the cockpit. Alternatively, the fault signal provided by the control circuit could be connected to the aircraft's maintenance computer. Fault notification could also be made to the operator by altering the strobe light's output characteristics in a manner calculated to attract the operator's attention, such as altering the flash rate.

Servicing of the LED strobe light may be simplified with the inclusion of optional control circuit bench-test diagnostic features. For example, the strobe light could be configured with the capability to illuminate the LEDs dimly in a constant-on mode to facilitate visual inspection of the LED strobe for failed LED elements without the need for protective eyewear. In addition, one or more of the LEDs could be configured to transmit status and diagnostic data while in a bench-test mode by emitting a regular series of dim flashes. The number of flashes would correspond to pre-programmed diagnostic conditions. The status and diagnostic LEDs could also be used to optically couple serial data, such as fault codes, from the control circuit to a maintenance computer.

Accordingly, it is an object of this invention to provide a strobe light for use on an aircraft that provides long operating life and the necessary light intensities without resorting to xenon lamps or high-voltage power supplies. This invention overcomes the drawbacks of prior strobe lights through the use of light emitting diodes.

The present invention comprises a strobe light for use on an aircraft, comprising: an electrically insulative, thermally conductive base; at least one electrically conductive ring, placed over said base; at least one light ring comprising a plurality of light sources arranged about the circumference of an electrically insulative, thermally conductive disk, said light ring being placed over said electrically conductive ring; an electrically conductive cover, placed over said light ring; a control circuit for transmitting regular pulses of electrical current between said cover and said base; and means for securing together said base and said cover.

These and other features will become better understood with reference to the following description, appended claims, and accompanying drawings.

BRIEF DESCRIPTION OF THE DRAWINGS

FIGS. 1-a and 1-b are views of typical LED strobe light installation locations on an aircraft, FIGS. 2-a and 2-b are views of the cover, FIGS. 3-a and 3-b are views of the base, FIGS. 4-a and 4-b are views of the LED ring.

DETAILED DESCRIPTION OF THE INVENTION

Figure 5:
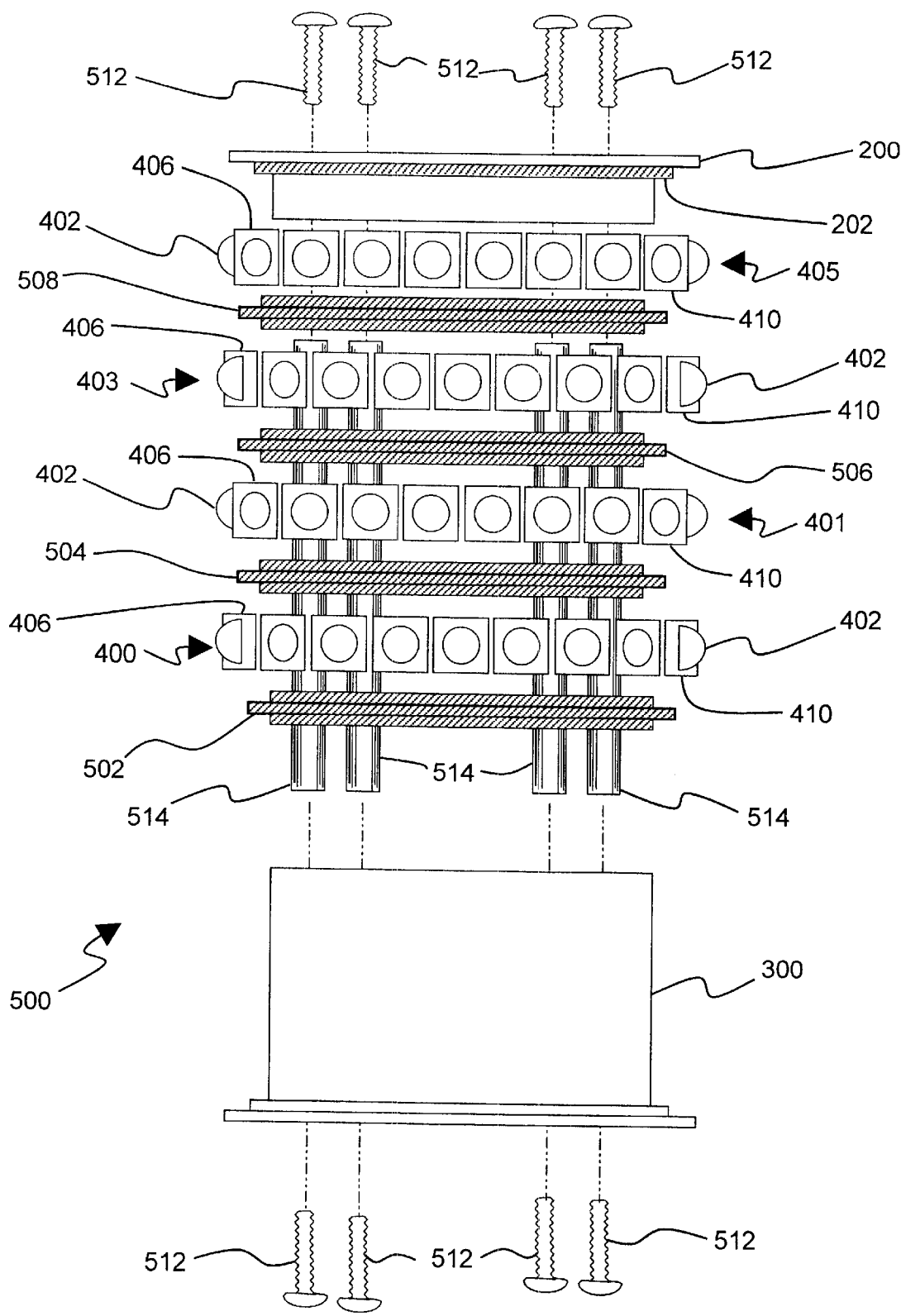
FIG. 5 is a view of the general arrangement of the LED strobe lamp.

The LED strobe lights are installed on an aircraft as generally shown in FIG. 1. The LED strobe lights may be installed in any combination desired as an upper fuselage light strobe 102, as a lower fuselage strobe 104, a tail strobe 106, or wingtip strobes 108. The LED strobe light may also be similarly mounted as desired on rotary-wing aircraft.

The cover 200 is illustrated by FIGS. 2-a and 2-b. Cover 200 is made from an electrically conductive material, such as aluminum. Cover 200 is then anodized or coated to make all surfaces electrically non-conductive, except for the cover electrical connection surface 202. Cover electrical connection surface 202 may treated by a conventional irridite process to ensure electrical conductivity. It should be noted that electrical connection surface 202 may also be formed by any alternate fabrication process, for example, bonding an electrically conductive material such as beryllium copper to cover 200. A plurality of clearance holes 204 are provided to facilitate assembly.

The base 300 is illustrated by FIGS. 3-a and 3-b. Base 300 is made from an electrically insulative, thermally conductive material, such as anodized aluminum. A plurality of clearance holes 302 are provided to facilitate assembly.

As shown in FIG. 4, the light sources 402, preferably light emitting diodes, are mounted onto disk 404. Disk 404 is made from an electrically insulative, thermally conductive material, such as anodized aluminum. The LEDs 402 are placed around the entire circumference of disk 404 such that the anodes 406 of all LEDs 402 are placed against the first planar surface 408 of disk 404, and the cathodes 410 of all LEDs 402 are placed against the second planar surface 412 of disk 404 to form an LED ring 400. LEDs having planar electrical leads 406, 410 are preferred as this minimizes the spacing between the LED rings of strobe lamp 500, shown in FIG. 5 and discussed in detail below, and aids to uniformly distribute the light emitted by the LED strobe lamp 500.

The general arrangement of the LED strobe lamp 500 is shown in FIG. 5. A first electrically conductive ring 502 is installed onto the base 300. A first LED ring 400 is placed onto the base 300 and over the first electrically conductive ring 502 such that the cathodes 410 of LEDs 402 on first LED ring 400 are placed into electrical contact with the first electrically conductive ring 502. A second electrically conductive ring 504 is then installed over the first LED ring 400 such that the anodes 406 of LEDs 402 on first LED ring 400 are placed into electrical contact with second electrically conductive ring 504. A second LED ring 401 is then installed onto the second electrically conductive ring 504, placing the cathodes 410 of LEDs 402 on second LED ring 401 against the second electrically conductive ring 504. The LEDs 402 on second LED ring 401 are preferably oriented such that the LEDs are not in vertical alignment with the LEDs on first LED ring 400. This staggered LED pattern aids to uniformly distribute the light emitted by LED strobe lamp 500. A third electrically conductive ring 506 is then placed onto the second LED ring 401. Additional LED ring assemblies of the quantity desired, such as 403 and 405, and additional electrically conductive rings, such as 508, may be stacked in a like manner, ending with an LED ring such as 405. The cover 200 is then installed such that the cover electrical connection surface 202 is placed into contact with the anodes 406 of the LEDs 402 on ending LED ring 405. Cover 200 and base 300 are mechanically secured to each other by conventional fastening means, such as a plurality of screws 512 and electrically insulative spacers 514, compressing the stacked assembly together to secure the assembly and to provide an electrical path between cover electrical connection surface 202, LED rings 400, 401, 403, 405, and electrically conductive rings 502, 504, 506, 508.

Figure 6:
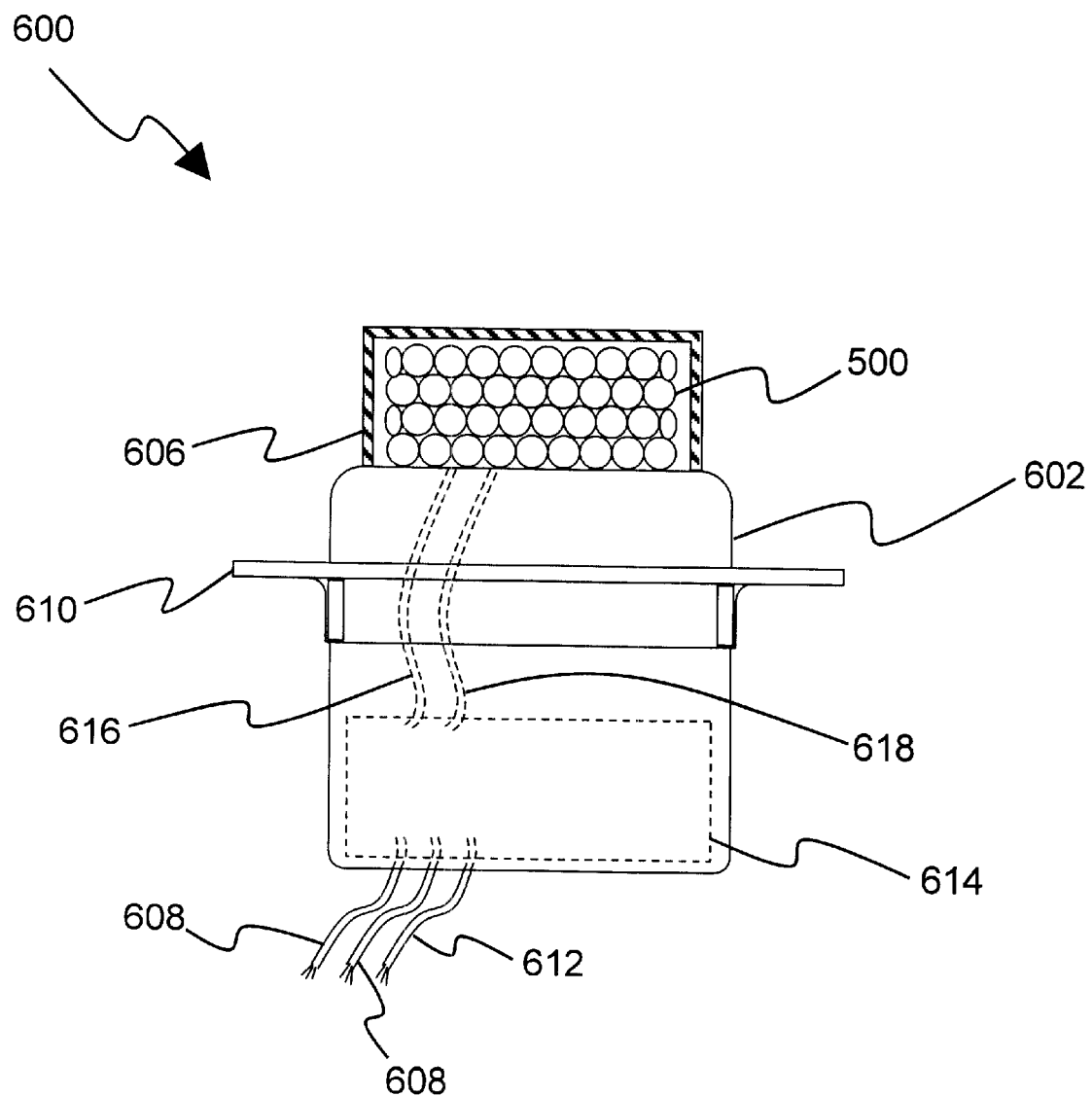
FIG. 6 is an illustration of the general arrangement of the LED strobe light.

The LED strobe lamp 500 may be mounted onto a housing structure 602 as shown in FIG. 6. Housing 602 may be used to contain internal components of LED strobe light 600 as desired, such as the control circuit 614. Housing 602 may include mounting points such as a flange 610 to facilitate mounting of the strobe light 600 onto an aircraft. A lens 606 may be included to protect the components of LED strobe light 600 from the elements. Electrical power is provided to the control circuit 614 by the electrical wiring 608. The control circuit 614 is electrically connected to the strobe lamp 500 by the wires 616, 618. The control circuit 614 may be mounted inside the housing structure 602, or may be located remotely. Synchronization with other LED strobe lights 600 may be accomplished by connecting together the SYNC wires 612 on the LED strobe lights 600, as discussed below. It should be noted that the wires 608, 612, 616, 618 may be substituted by any conventional electrical connection means, such as connectors, printed wiring, and terminals.

Figure 7:
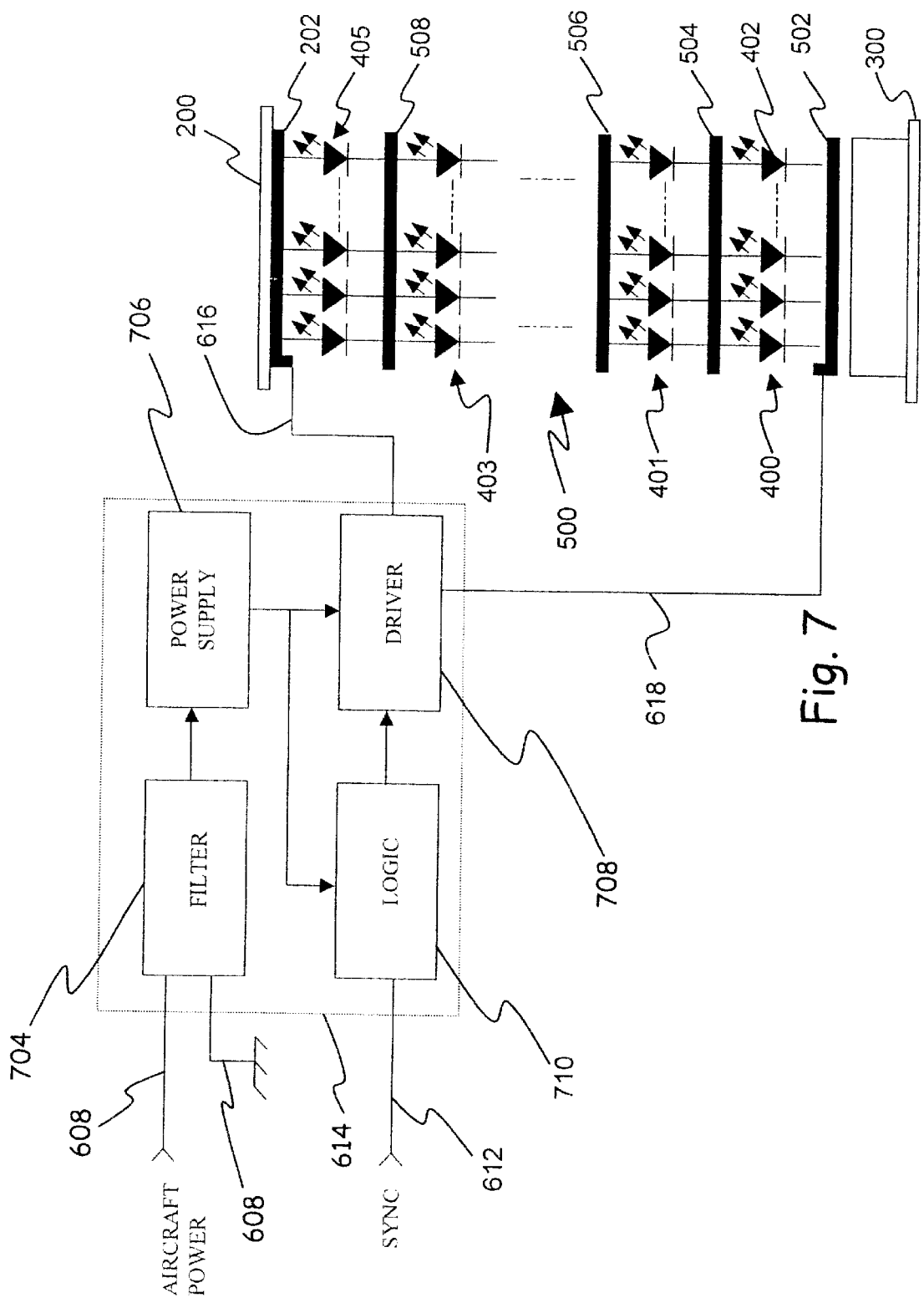
FIG. 7 is an electrical schematic of the LED strobe light.

A schematic diagram of the electrical circuit for LED strobe light 600 is shown in FIG. 7. Electrical power from the aircraft is supplied to control circuit 614 by electrical wiring 608. The protection filter 704 isolates electrical noise, such as electromagnetic interference, between the aircraft and control circuit 614. The power supply 706, such as a voltage regulator, conditions the electrical power from the aircraft to a voltage level suitable for the components in control circuit 614. The driver 708, such as a current limiter, controls the amount of current supplied to the light sources 402. The light sources 402 may be operated at less than their rated power if desired, to increase the life of light sources 402. Electrical current from driver 708 is supplied to the electrical connection surface 202 of cover 200 by a driver output wire 616. Electrical current flows through the LED rings 405, 403, 401, 400, which are wired in a series-parallel array. Electrically conductive rings 508, 506, 504 provide electrical contact between the LED rings. The return path for the electrical current is through an electrical connection made between driver 708 and electrically conductive ring 502 by the driver return wire 618.

Figure 8:
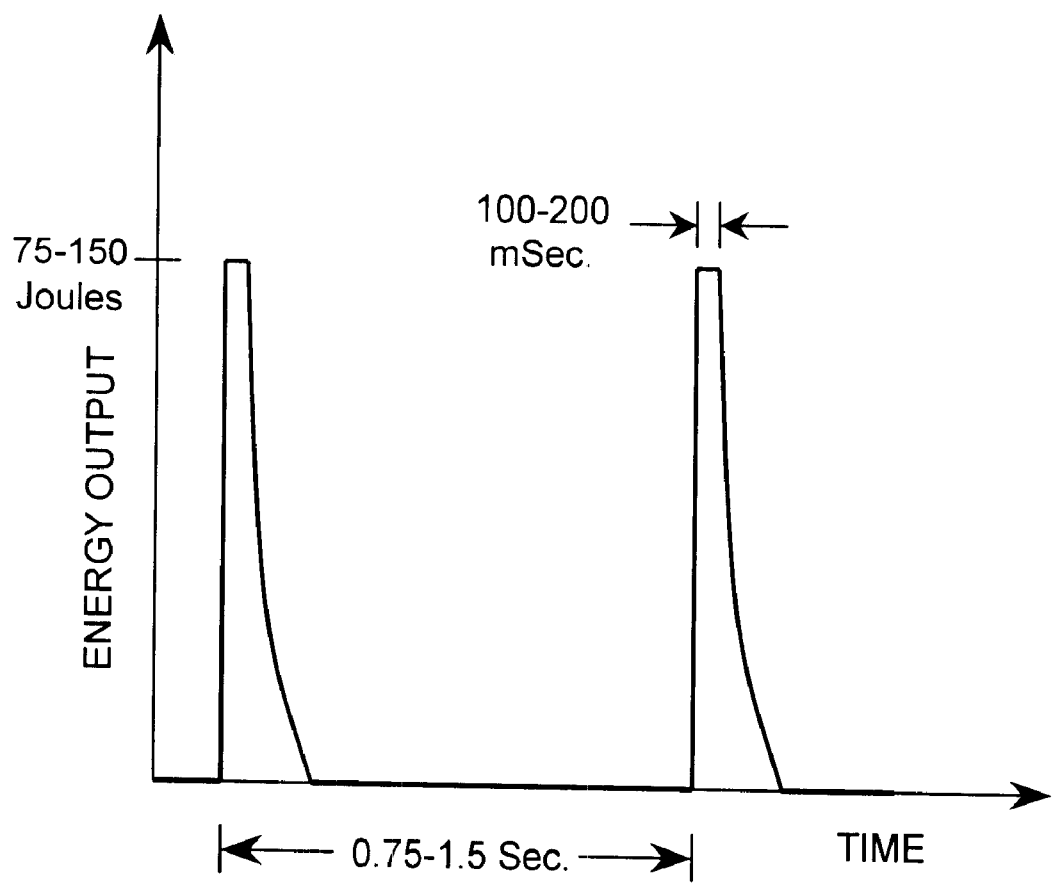
FIG. 8 illustrates the typical timing and output power characteristics of the LED strobe light.
Figure 9:
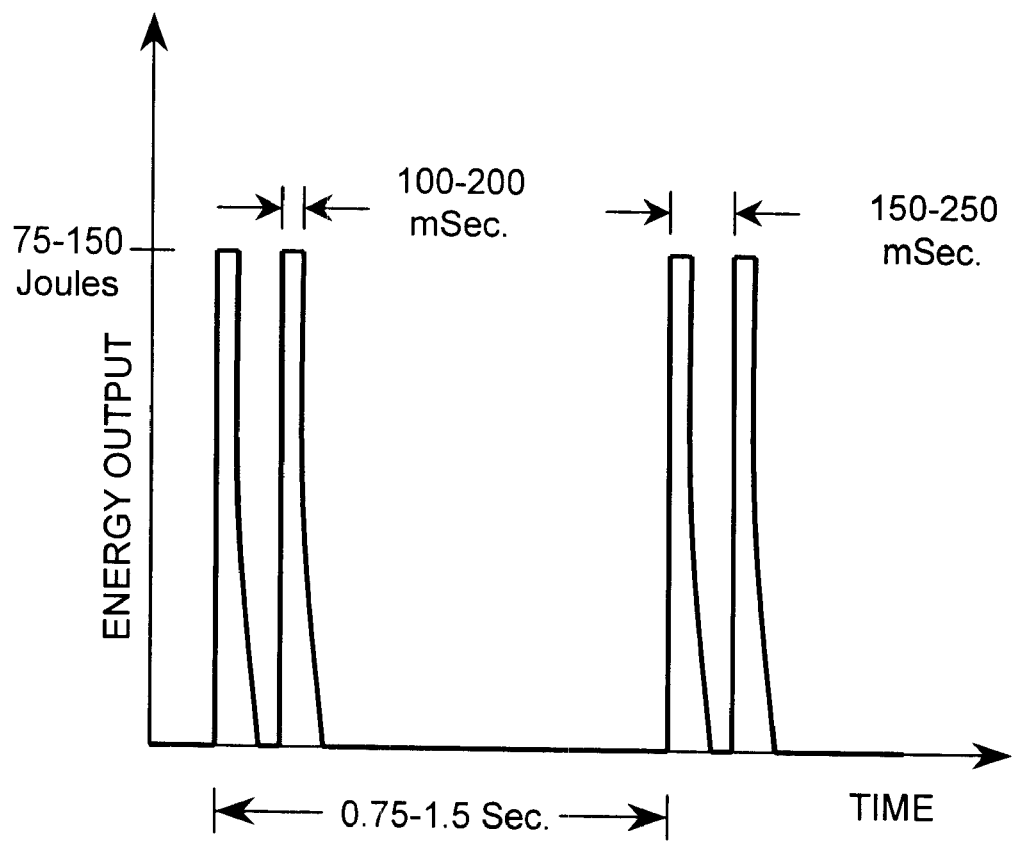
FIG. 9 illustrates the typical characteristics of an optional "multi-flash" feature.

The logic circuit 710 controls the on and off cycle times of light sources 402, thus controlling the flash rate of strobe lamp 500. The "on" time of strobe lamp 500 may consist of a single flash approximately every second, as illustrated by FIG. 8. The "on" time of strobe lamp 500 may optionally consist of a set of two or more closely-timed flashes, as illustrated by FIG. 9, to further enhance the attention-getting characteristics of the strobe lamp 500. Logic circuit 710 may also optionally provide such additional functions as temperature compensation for stabilized strobe light brightness, fault monitoring, fault alerting, and diagnostics for the LED strobe light 600.

Figure 10:
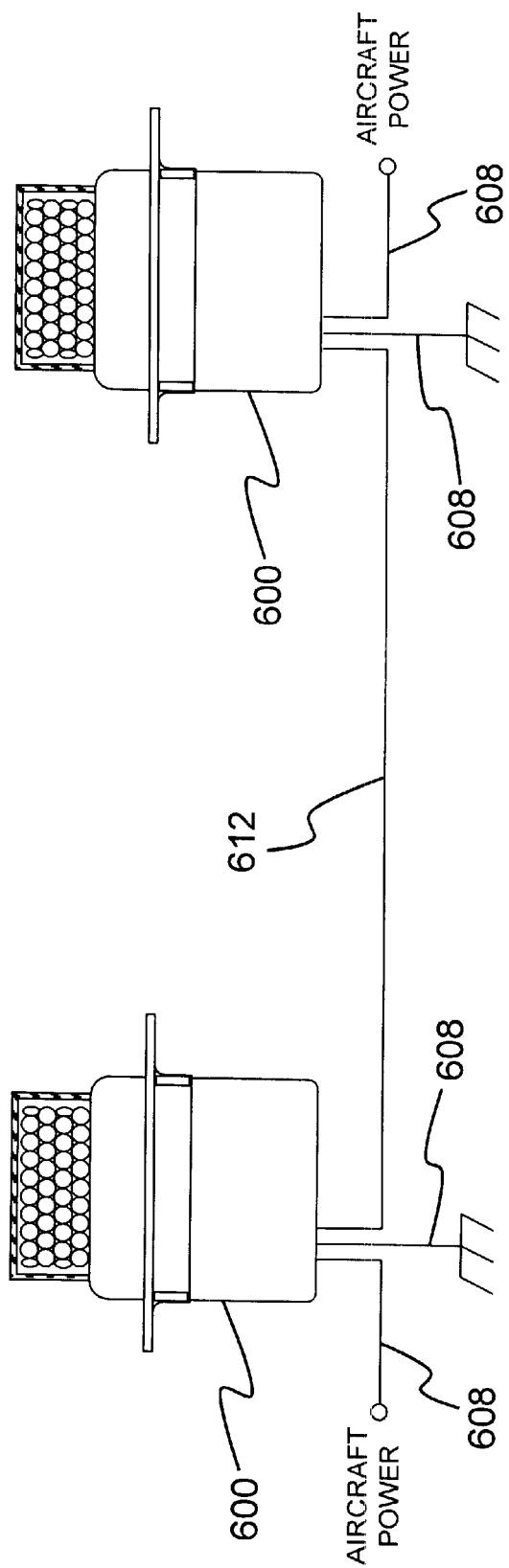
FIG. 10 is an electrical wiring diagram for the LED strobe light.
Figure 11:
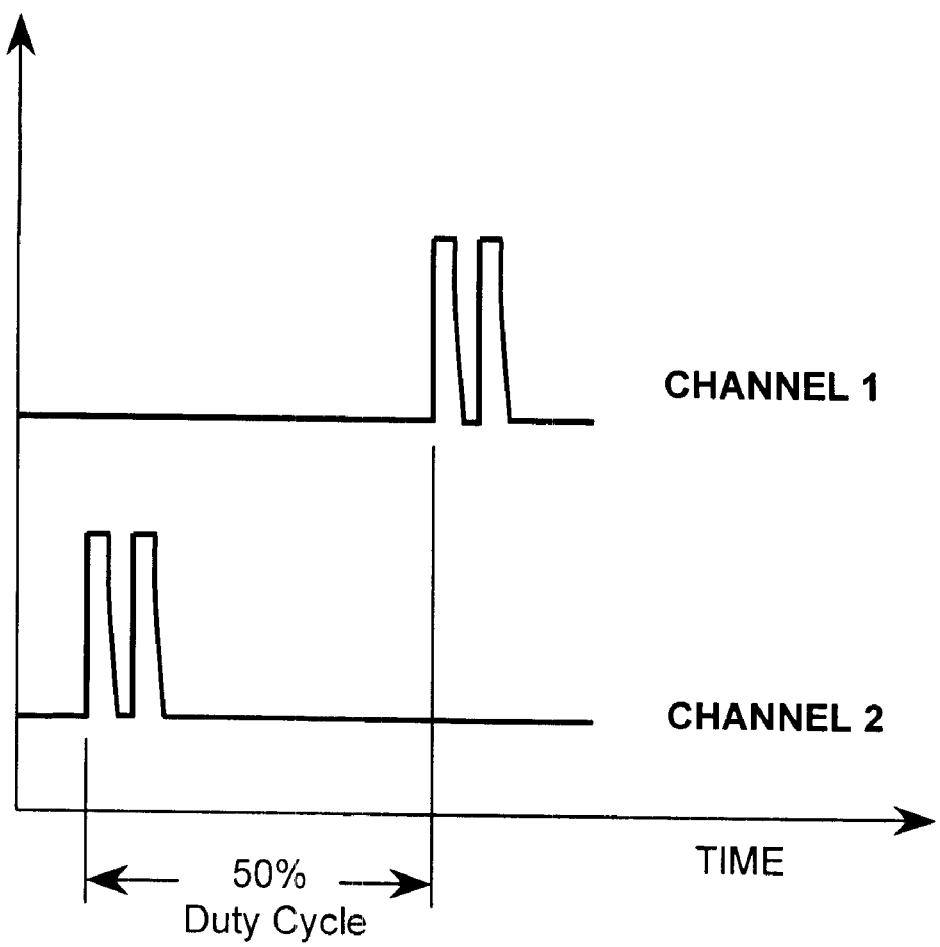
FIG. 11 shows the typical timing of an optional alternating-flash output for two or more LED strobe lights.

LED strobe lights 600 may optionally be configured as shown in FIG. 10 for synchronous operation. Two or more LED strobe lights 600 are linked together with SYNC line 612. The LED strobe lights 600 will flash together in unison, or optionally in an alternating pattern as illustrated in FIG. 11.

In operation, the strobe lights 600 are mounted in the desired positions on the aircraft. The strobe light 600 may be installed in any desired combination as an upper fuselage strobe light 102, a lower fuselage strobe light 104, a tail strobe light 106, or wingtip strobe lights 108. When electrical power is supplied to the LED strobe lights 600, the strobe lamps 500 will produce a burst of light at regular intervals, preferably about once per second. This regular burst of light is easily observed by other aircraft in the area of the lighted aircraft, thereby aiding in the prevention of a collision.

The present invention has been described herein with reference to a particular embodiment for a particular application. Those having ordinary skill in the art and access to the present teachings will recognize additional modifications, applications, and embodiments within the scope thereof. For example, the present invention is not limited to aviation uses. Indeed, the present invention is immediately applicable to all types of vehicular traffic, including automotive, marine, and railroad. Further, the present invention may be used in place of any prior strobe light, or in any situation where safety devices or signs may benefit from the addition of a strobe light.

What is claimed is:

1. A strobe light, comprising:
   an electrically insulative, thermally conductive base;
   at least one electrically conductive ring, placed over said base;
   at least one light ring comprising a plurality of light sources arranged about the circumference of an electrically insulative, thermally conductive disk, said light ring being placed over said electrically conductive ring;
   an electrically conductive cover, placed over said light ring;
   a control circuit for transmitting regular pulses of electrical current between said cover and said base; and
   means for securing together said base and said cover.

2. The strobe light of claim 1, further comprising a second electrically conductive ring placed over said light ring and a second light ring placed over said electrically conductive ring, said cover being placed over said second light ring.

3. The strobe light of claim 2, further comprising additional light rings and additional electrically conductive light rings alternatingly stacked and ending with a last light ring, said cover being placed over the last said light ring.

4. The strobe light of claim 1 wherein said control circuit is one of located inside said strobe light and located remotely from said strobe light.

5. The strobe light of claim 4 wherein said control circuit includes means for monitoring fault conditions and alerting the operator of said fault conditions.

6. The strobe light of claim 4 wherein said control circuit includes means for monitoring temperature and compensating for the effects of variations in temperature on said light sources.

7. The strobe light of claim 1, further comprising a housing structure with mounting points to facilitate installation of said strobe light.

8. The strobe light of claim 7 wherein said mounting points comprise a flange.

9. The strobe light of claim 1, further comprising a lens to protect said strobe light from the environment.

10. The strobe light of claim 1 wherein said strobe light flashes once approximately every second.

11. The strobe light of claim 1 wherein said strobe light flashes more than once in rapid succession, at intervals of approximately once per second.

12. The strobe light of claim 1 wherein said control circuit causes said strobe light to flash one of in unison and in an alternating light pattern with other said strobe lights.

13. The strobe light of claim 1 wherein said strobe light is installed on an aircraft.

14. A strobe light, comprising:
   an electrically insulative, thermally conductive base;
   a first electrically conductive ring, placed over said base;
   a first light ring comprising a plurality of light sources arranged about the circumference of an electrically insulative, thermally conductive disk, said light ring being placed over said electrically conductive ring;
   a second electrically conductive ring, placed over the first light ring;
   additional light rings and additional electrically conductive rings placed over the second electrically conductive ring, said additional light rings and said additional electrically conductive rings being alternatingly stacked and ending with a last light ring;
   an electrically conductive cover, placed over said last said light ring;
   means for securing together said base and said cover; and
   a control circuit for transmitting regular pulses of electrical current between said cover and said base.

15. A strobe light, comprising:
   an electrically insulative, thermally conductive base;
   a first electrically conductive ring, placed over said base;
   a first light ring comprising a plurality of light sources arranged about the circumference of an electrically insulative, thermally conductive disk, said light ring being placed over said first electrically conductive ring;

a second electrically conductive ring, placed over the first light ring;

additional light rings and additional electrically conductive rings placed over the second electrically conductive ring, said additional light rings and said additional electrically conductive rings being alternatingly stacked and ending with a last said light ring;

an electrically conductive cover, placed over said last light ring;

means for securing together said base and said cover;

a housing structure with mounting points to facilitate installation of said strobe light;

a lens to protect said strobe light from the environment; and a control circuit for transmitting regular pulses of electrical current between said cover and said base, wherein said control circuit is one of located inside said strobe light and located remotely from said strobe light.

16. A process for providing a strobe light, comprising:

providing an electrically insulative, thermally conductive base;

placing over said base at least one electrically conductive ring;

placing over said electrically conductive ring at least one light ring comprising a plurality of light sources arranged about the circumference of an electrically insulative, thermally conductive disk;

placing an electrically conductive cover over said light ring;

securing together said base and said cover; and transmitting regular pulses of electrical current between said cover and said base.

17. A process for providing a strobe light, comprising:

providing an electrically insulative, thermally conductive base;

placing over said base a first electrically conductive ring;

placing over said first electrically conductive ring a first light ring comprising a plurality of light sources arranged about the circumference of an electrically insulative, thermally conductive disk;

placing a second electrically conductive ring over the first light ring;

alternately stacking additional light rings and additional electrically conductive rings over the first electrically conductive ring, ending with a last light ring;

placing an electrically conductive cover over said last said light ring;

securing together said base and said cover; and transmitting regular pulses of electrical current between said cover and said base.

18. A process for providing a strobe light, comprising:

providing an electrically insulative, thermally conductive base;

placing over said base a first electrically conductive ring;

placing over said first electrically conductive ring a first light ring comprising a plurality of light sources arranged about the circumference of an electrically insulative, thermally conductive disk;

placing a second electrically conductive ring over the first light ring;

alternately stacking additional light rings and additional electrically conductive rings over the first electrically conductive ring, ending with a last light ring;

placing an electrically conductive cover over said last said light ring;

securing together said base and said cover;

providing a housing structure with mounting points to facilitate installation of said strobe light;

providing a lens to protect said strobe light from the environment; and transmitting regular pulses of electrical current between said cover and said base by means of a control circuit, wherein said control circuit is one of located inside said strobe light and located remotely from said strobe light.

* * * * *